(12) United States Patent
Lin et al.

(10) Patent No.: US 11,312,086 B1
(45) Date of Patent: Apr. 26, 2022

(54) ROLL-AND-PEEL TOOL AND METHOD OF INSTALLING A TRIM COMPONENT USING THE ROLL-AND-PEEL TOOL

(71) Applicant: GM GLOBAL TECHNOLOGY OPERATIONS LLC, Detroit, MI (US)

(72) Inventors: Yhu-Tin Lin, Rochester Hills, MI (US); Terebara A. Hughes, Redford, MI (US); Erik B. Golm, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/114,747

(22) Filed: Dec. 8, 2020

(51) Int. Cl.
*B32B 41/00* (2006.01)
*B29C 65/50* (2006.01)
*B29C 65/00* (2006.01)
*B29L 31/30* (2006.01)

(52) U.S. Cl.
CPC ...... *B29C 65/5092* (2013.01); *B29C 66/8362* (2013.01); *B29L 2031/3041* (2013.01)

(58) Field of Classification Search
CPC ............. B29C 65/5092; B29C 66/8362; B29L 2031/3041
USPC .................... 156/60, 64, 350, 351, 378, 379
See application file for complete search history.

(56) References Cited

U.S. PATENT DOCUMENTS

| 2007/0221323 A1* | 9/2007 | Oba | B60J 10/86 |
| | | | 156/306.6 |
| 2011/0031308 A1* | 2/2011 | Holland-Letz | B65H 31/22 |
| | | | 235/379 |

* cited by examiner

*Primary Examiner* — Michael N Orlando
*Assistant Examiner* — Joshel Rivera
(74) *Attorney, Agent, or Firm* — Quinn IP Law

(57) ABSTRACT

A roll-and-peel tool includes a frame, a roller, two traction rims, a peeling wheel, and a trailer arm. A roller shaft is supported by the frame, and the roller is rotatable relative to the frame on the shaft. The traction rims are axially-spaced from one another with a roller midportion between the traction rims and the traction rims extending outward of the roller midportion. The peeling wheel is rotatable about a wheel shaft and has two traction hubs axially-spaced from one another and protrusions extending proud at an exterior surface of the peeling wheel between the traction hubs. The trailer arm connects the wheel and roller shafts so that the traction hubs interface with the traction rims and a gap is defined between the roller and the peeling wheel with the protrusions extending into the gap. A method of installing a trim component may be carried out with the tool.

20 Claims, 7 Drawing Sheets

ROLL-AND-PEEL TOOL AND METHOD OF INSTALLING A TRIM COMPONENT USING THE ROLL-AND-PEEL TOOL

INTRODUCTION

The present disclosure generally relates to a tool for installing a trim component that attaches to a body with adhesive, and a method of installing a trim component.

Some trim components have an adhesive side to be placed in contact with a body, and, in a pre-installed state, are covered by a disposable face liner and/or secured to a foam carrier that protects the trim component. Typically, installation of such trim components is done by hand and involves multiple steps such as peeling off a tape liner from the adhesive side, placing the trim component on the body, applying pressure with a wet-out roller to wet-out the adhesive, and then peeling away any disposable foam carrier and/or surface liner.

SUMMARY

The present disclosure generally relates to a roll-and-peel tool that simultaneously rolls a trim component to wet-out adhesive and peels away a temporary support member, such as a foam carrier or face liner. Example implementations include automotive assembly processes, such as installation of emblems on vehicle body panels, or nonautomotive assembly processes. The roll-and-peel tool reduces cycle time by achieving multiple installation operations in one motion. Additionally, the tool may be adapted to be used manually, or to be used robotically to automate the operations.

A roll-and-peel tool for installing a trim component on a body includes a frame, a roller having two traction rims, a peeling wheel, and a trailer arm. A roller shaft is supported by the frame, and the roller is rotatable relative to the frame on the roller shaft. The traction rims are axially-spaced from one another along the roller with a roller midportion between the two traction rims and the traction rims extending outward (e.g., radially outward) of the roller midportion. The peeling wheel is rotatable about a wheel shaft and has two traction hubs axially-spaced from one another and a plurality of protrusions extending proud at an exterior surface of the peeling wheel between the traction hubs. The trailer arm connects the wheel shaft and the roller shaft so that the traction hubs interface with the traction rims and a gap is defined between the roller midportion and the peeling wheel with the protrusions extending into the gap.

When the tool is positioned over the trim component and made to roll across the body by applying force to the frame, the roller rolls over an exterior side of the trim component in a direction of movement of the frame with the peeling wheel trailing the roller and driven to rotate in a direction opposite to a direction of rotation of the roller by the traction rims interfacing with the traction hubs. The protrusions are configured to engage a peel-away support member that is secured to the trim component in a pre-installation state, and peel it away from the trim component in the gap as the tool rolls. For example, the protrusions may be hooks of a hook-and-loop material or may be integral pointed portions of the roller material. A guide member may be secured to the frame to help guide the peel-away support member upward and rearward over the peeling wheel, ready for disposal or recycling. The wet-out function of the roller and the peeling task are thus accomplished by a single tool in one operation.

In some implementations, the roller serves as both a traction roller (engaged with the peeling wheel via the traction rims and traction hubs) and a pressure roller by which pressure is applied to the trim component to wet-out the adhesive. Such an embodiment may be referred to as a single roller embodiment. In other implementations, the roller serves as a traction roller, the roller shaft is a traction roller shaft, and the tool further includes a pressure roller and a pressure roller shaft. The pressure roller shaft is supported by the frame, and the pressure roller is rotatable relative to the frame on the pressure roller shaft. The traction roller shaft is supported by the frame rearward of the pressure roller. The pressure roller is configured to roll on and apply pressure to the exterior side of the trim component to wet out the adhesive side against the body. The traction rims of the traction roller may be configured to straddle over the trim component and roll on the body in a direction of movement of the frame, creating a three-point contact of the roll-and-peel tool with the trim component and the body, which may provide greater surety of position and distribution of pressure of the tool on the trim component.

Because the trailing arm floatingly links the peeling wheel to trail behind the traction roller, the roll-and-peel tool may also include features to stabilize the peeling wheel and/or to adjust and maintain sufficient traction between the traction rims and the traction hubs. For example, the roll-and-peel tool may include a peeling wheel stabilizer, such as a torsion spring centered about an axis of the roller. The torsion spring may have a first leg fixed to the frame and a second leg extending along the trailer arm and fixed to the wheel shaft or to the trailing arm. In another example, the peeling wheel stabilizer may include a first link pivotably connected to the frame, a second link pivotably connected to the wheel shaft, a set screw slidably connecting the first and second links, and a compression spring surrounding the set screw.

The roll-and-peel tool may additionally include a traction adjustment mechanism that has a set screw supported by the trailer arm or a threaded portion of the trailer arm serving as a set screw, and a compression spring acting against the wheel shaft. The set screw may be adjustable to change a contact pressure between the traction rims and the traction hubs.

A method of installing a trim component on a body includes placing an adhesive side of the trim component against the body, positioning a roll-and-peel tool over the trim component, and rolling the roll-and-peel tool along the body, the roll-and-peel tool simultaneously wetting out the adhesive side against the body and peeling a peel-away support member away from the trim component.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

The drawings described herein are for illustrative purposes only, are schematic in nature, and are intended to be exemplary rather than to limit the scope of the disclosure.

DETAILED DESCRIPTION

Figure 1A:
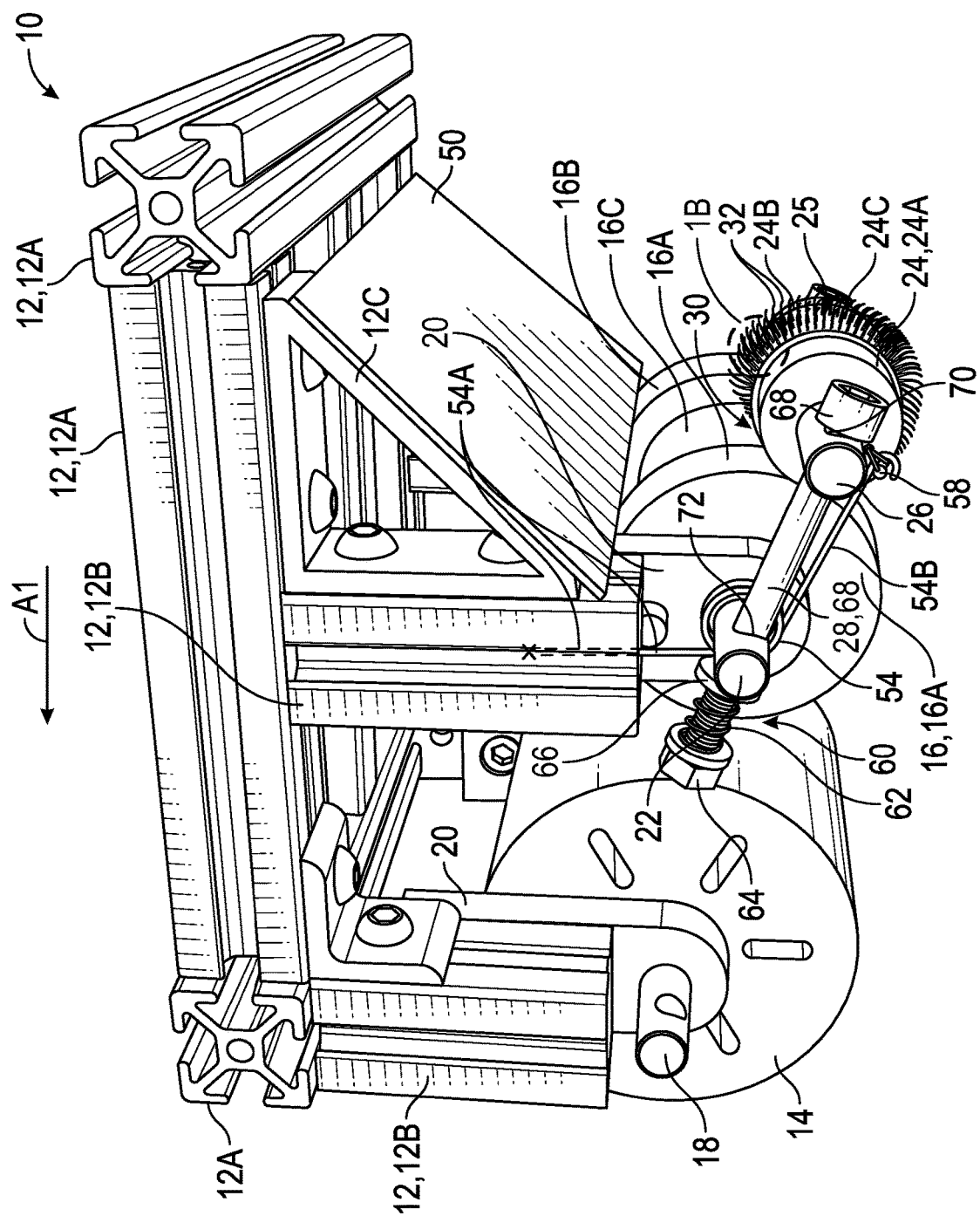
FIG. 1A is a perspective view of a first embodiment of a roll-and-peel tool.

Referring to the drawings, wherein like reference numbers refer to like components, FIG. 1A shows a first embodiment of a roll-and-peel tool 10 (also referred to herein simply as a tool) that simultaneously pressure rolls a trim component 100 (shown in FIG. 2) for wet-out of an adhesive side and peels away a disposable peel-away support member 110, such as a foam carrier and/or an overlaying face liner, reducing assembly processes and cycle time. As discussed herein, the tool 10 may be adapted to be used manually or may be automated for robotic use.

The tool 10 includes a frame 12 and both a pressure roller 14 and a traction roller 16 operatively connected to the frame 12. The frame 12 is shown with multiple elongated beams 12A disposed horizontally and creating a relatively strong and light box-like structure, and additional elongated beams 12B connected to and extending vertically downward from the beams 12A to support the rollers 14, 16. A variety of other configurations may be used for the frame 12, including simple top and side walls rather than beams.

Figure 3:
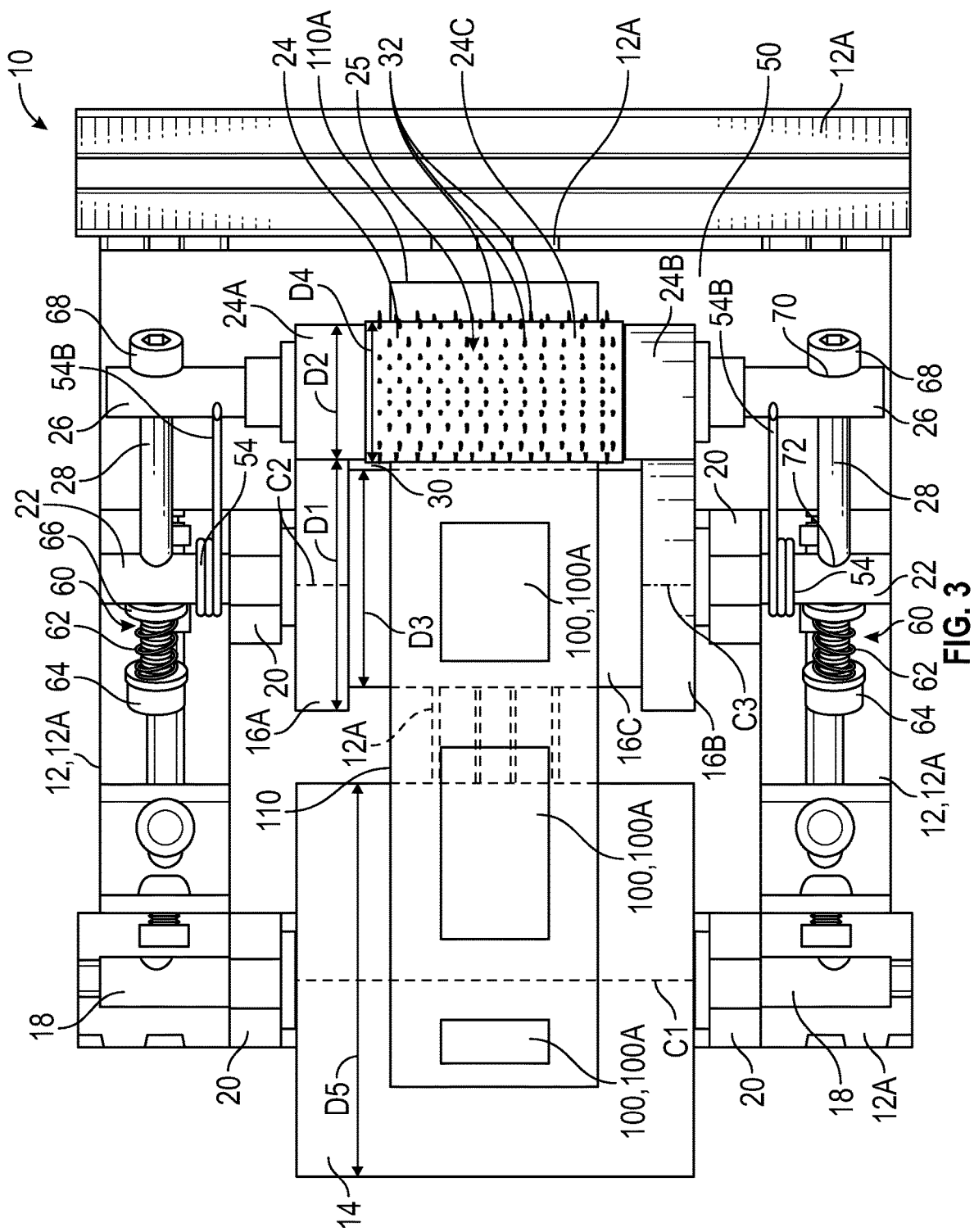
FIG. 3 is a bottom view of the roll-and-peel tool and trim component of FIG. 2, with the panel not shown.

A pressure roller shaft 18 is supported by the frame 12 via a link 20 secured to the frame 12. An additional link 20 supports the other end of the pressure roller shaft 18, as best shown in FIG. 3. The pressure roller 14 is mounted on the pressure roller shaft 18 and is rotatable about the shaft 18 relative to the frame 12. As discussed herein, a direction of forward movement of the tool 10 is shown by arrow A1 so that the pressure roller 14 is disposed near a forward end of the tool 10. The traction roller 16 is thus disposed rearward of the pressure roller 14. A traction roller shaft 22 is supported by the frame 12 via links 20 secured to the frame 12 at either end of the traction roller shaft 22, as best shown in FIG. 3. The traction roller 16 is mounted on the traction roller shaft 22 and is rotatable about the traction roller shaft 22 relative to the frame 12.

The traction roller 16 includes two traction rims 16A, 16B axially-spaced from one another along the traction roller 16, and a traction roller midportion 16C extending between the two traction rims 16A, 16B. The traction rims 16A, 16B each extend outward of (e.g., radially-outward of) and have a greater diameter than the traction roller midportion 16C. The traction rims 16A, 16B may be an integral unitary component with the traction roller midportion 16C, or the traction rims 16A, 16B may be separate components disposed at either end of the traction roller midportion 16C.

The tool 10 also includes a peeling wheel 24 that is mounted on and is rotatable about a wheel shaft 26. The peeling wheel 24 is disposed rearward of the traction roller 16. The peeling wheel 24 includes two traction hubs 24A, 24B axially-spaced from one another and a peeling wheel midportion 24C extending between the traction hubs 24A, 24B. The axial spacing of the traction hubs 24A, 24B is the same as the axial spacing of the traction rims 16A, 16B. The traction hubs 24A, 24B may be an integral unitary component with the peeling wheel midportion 24C.

A trailer arm 28 is disposed at either side of the tool 10. One trailer arm 28 is visible in FIG. 1A, and both trailer arms 28 are visible in the bottom view of FIG. 3. Each trailer arm 28 connects the wheel shaft 26 and the traction roller shaft 22 so that the traction hubs 24A, 24B interface with the traction rims 16A, 16B. More specifically, traction hub 24A interfaces with traction rim 16A, and traction hub 24B interfaces with traction rim 16B. Because they interface, rotation of the traction rims 16A, 16B will drive the traction hubs 24A, 24B to rotate in an opposing direction.

Figure 2:
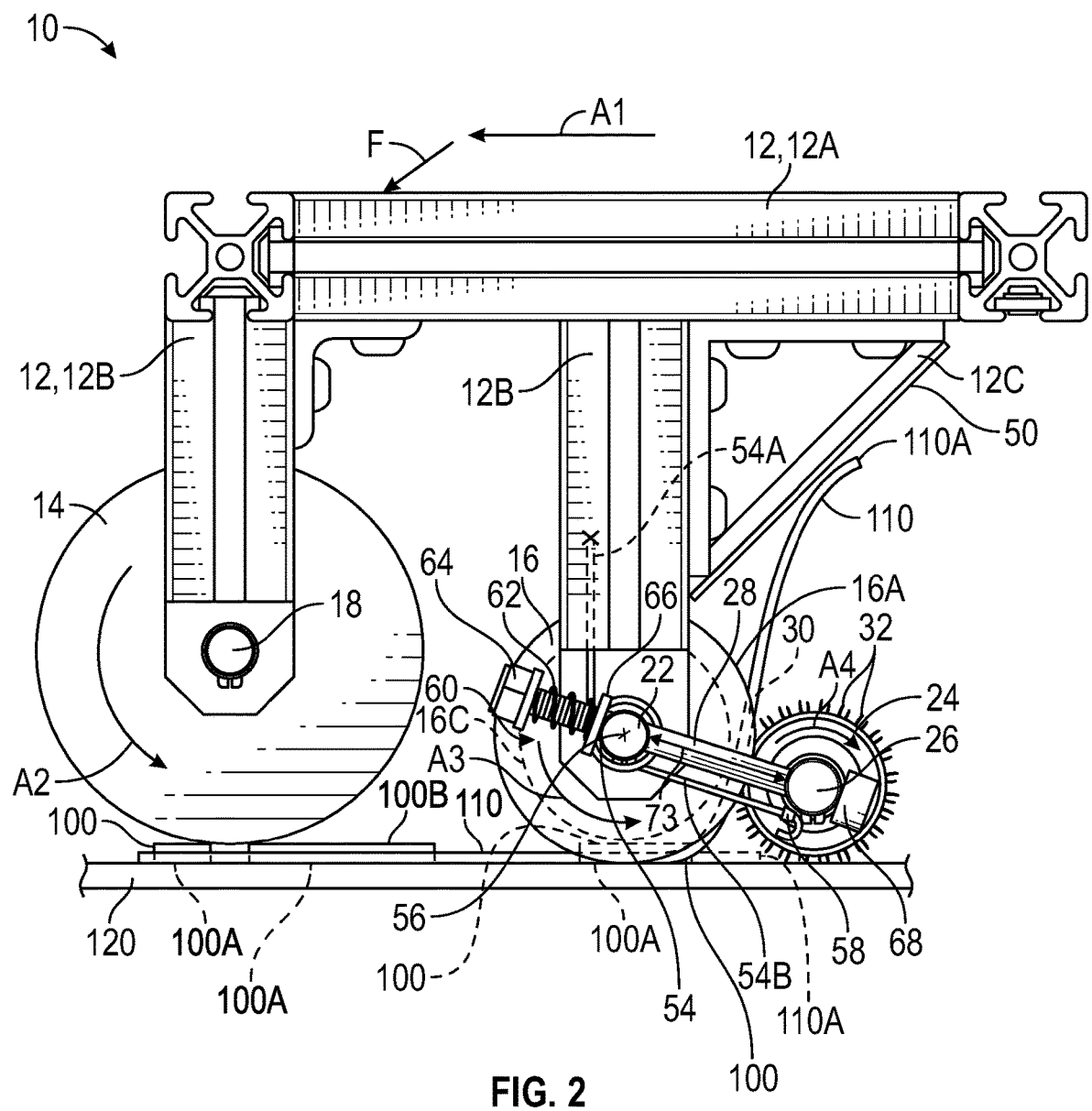
FIG. 2 is a side view of the roll-and-peel tool of FIG. 1A shown installing a trim component on a body, with the body shown in fragmentary view.

Referring to FIG. 3, the sum of the diameter D1 of the interfacing traction rim 16A and the diameter D2 of the traction hub 24A (or the like sum of the diameters of traction rim 16B and traction hub 24B) is greater than the sum of the diameter D3 of the traction roller midportion 16C and the diameter D4 of the peeling wheel midportion 24C. Because of this, the midportions 16C, 24C do not interface, and a gap 30 is defined between the traction roller midportion 16C and the peeling wheel midportion 24C. The gap 30 is best indicated in FIGS. 2 and 3. The diameter D5 of the pressure roller 14 is greater than the diameter D1 of each traction rim 16A, 16B, and the diameter D1 of each traction rim 16A, 16B is greater than the diameter D2 of each traction hub 24A, 24B. The relatively large diameter D5 of the pressure roller 14 better enables wet-out of the adhesive side 100A of the trim component 100. The relatively small diameter D4 of the wheel midportion 24C enables the peel-away support member 110 to better exit over the peeling wheel 24.

Figure 1B:
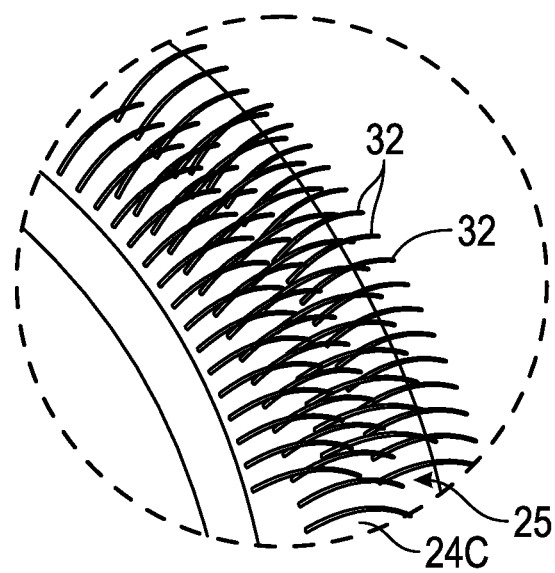
FIG. 1B is a close-up fragmentary view of protrusions on a peeling wheel of FIG. 1A.

The peeling wheel 24 has a plurality of protrusions 32 that extend proud at an exterior surface 25 of the peeling wheel midportion 24C. The protrusions 32 extend around the entire exterior surface 25, including into the gap 30 between the traction hubs 24A, 24B. The protrusions 32 may be tooth-like spikes of the material at the exterior surface 25 of the peeling wheel midportion 24C itself, or may be a different material secured to the exterior surface 25. The protrusions 32 are sufficiently stiff to engage a peel away support member 110 and peel it away from the trim component 100 as the protrusions 32 rotate with the peeling wheel 24 through the gap 30 during installation of the trim component 100 on a body 120 as discussed herein, but are soft enough so as not to engage with the harder trim component 100 or scratch the surface of the body 120. In the embodiment shown in FIGS. 1A and 1B, the protrusions 32 are hooks of a hook-and-loop material secured on the exterior surface 25 of the midportion 24C. FIG. 1B shows an alternate embodiment, in which protrusions 32A are configured as spiked teeth, similar to gear teeth, and are integral portions of the peeling wheel midportion 24C.

With reference to FIG. 2, the trim component 100 is secured to a peel-away support member 110 such as a foam carrier and/or a protective overlying face liner in a pre-installation state and is placed with an adhesive side 100A against a body 120. The adhesive side 100A includes a layer of adhesive disposed thereon, such as an adhesive tape. A liner may have initially covered the adhesive side 100A but is removed before placing the adhesive side 100A on the body 120. As shown in FIG. 3, the trim component 100 may be several discrete units or pieces which are surrounded on the sides by the peel-away support member 110, but have the adhesive side 100A exposed (not covered by the peel-away support member 110) to be secured to the body 120 of FIG. 2. The body 120 may be a vehicle body panel or other automotive component, for example, and the trim component 100 may be an emblem, such as a name plate. However, it should be appreciated that the trim component 100 and body 120 may be non-automotive components. In short, the roll-and-peel tool 10, and other roll-and-peel tools disclosed herein, may be used in a variety of both automotive and nonautomotive applications that utilize components secured by adhesive and needing pressure rolling and peeling.

As shown in FIG. 2, the roll-and-peel tool 10 is positioned over the trim component 100 with the pressure roller 14 contacting the exterior side 100B of the trim component 100 (and/or the peel-away support/member 110 if it overlies the trim component 100). When a force F having a downward and forward component is applied to the frame 12 (either manually or by an automated system such as by a robotic arm) in order to move the roll-and-peel tool 10 against and along the trim component 100 and body 120, the pressure roller 14 rolls along the body 120 on the trim component 100, rotating in the direction of arrow A2, rolling over and on and applying pressure (directly or indirectly) to the exterior side 100B of the trim component 100 (e.g., pressing the trim component 100 toward the body 120). This causes "wet-out" of the adhesive on the adhesive side 100A, which means that the adhesive flows under the pressure to be more uniformly distributed to eliminate gaps or air bubbles between the trim component 100 and the body 120. The force F may be applied directly to the frame 12, or may be applied via a grip that extends from the frame 12, such as grip 40 of FIG. 6. The grip 40 of FIG. 6 may be secured to one of the beams of the frame 12 directly over or just rearward of the pressure roller 14, such as a center, horizontally extending beam 12A that is best shown (partially) from below in FIG. 3. The grip 40 serves to locate where the force F is best applied to uniformly distribute pressure through the rollers 14, 16. Additionally, the grip 40 has a shape enabling a secure hold by a human hand or robotic arm. Alternatively, the force F may be applied directly to the frame 12, rather than via a grip, either manually or robotically, such as by a robotic arm.

The traction roller 16 likewise rolls across the trim component 100 rotating in the same direction as the pressure roller 14 as indicated by arrow A3. The relative sizes of the tool 10, the trim component 100, and a peel-away support member 110 in the pre-installed state may be selected so that the overall width of the trim component 100 and the peel-away support member 110 is less than a spacing between the axially-spaced traction rims 16A, 16B, as shown in FIG. 3, so that the traction rims 16A, 16B straddle over the trim component 100, but contact and roll directly on the body 120 rather than the trim component 100. As shown in FIG. 3, the pressure roller 14 and the traction rims 16A, 16B create a "three-point" rolling contact of the tool 10 with the trim component 100 and the body 120. The rolling contact of the pressure roller 14 is shown at C1. The rolling contact of the traction rims 16A, 16B is shown at C2 and C3, respectively.

The peeling wheel 24 trails the traction roller 16 and is driven to rotate in an opposite direction with respect to a direction of rotation of the traction roller 16 by the traction rims 16A, 16B interfacing with the traction hubs 24A, 24B, as indicated by arrow A4 in FIG. 2. The peel away support member 110 passes under the tool 10 first under the pressure roller 14 and then between the traction rims 16A, 16B. When an end 110A of the peel away support member 110 first encounters the protrusions 32 rotating with the peeling wheel 24, the protrusions 32 engage the peel-away support member 110, forcing it upwards into and through the gap 30, and peeling it away from the trim component 100 which remains securely adhered to the body 120, having first passed under the pressure roller 14. The peel-away support member 110 may be a relatively soft material, such as a foam carrier or a film, which better enables the protrusions 32 to engage the material of the peel-away support member 110. The trim component 100, in contrast, is a relatively hard material such as a plastic or metal that the protrusions 32 are not able to engage. Additionally, as shown in FIG. 2, the trim component 100 may extend further above the body 120 than the peel-away support member 110.

As shown in FIGS. 1A, 2, and 3, the roll-and-peel tool 10 includes a guide component 50 fixed to the frame 12 over the gap 30. The guide component 50 is configured to direct the peel-away support member 110 rearward over the peeling wheel 24 after the protrusions 32 push it through the gap 30. In the embodiment shown, the guide component 50 is a plate extending upwardly and rearwardly over the gap 30. The guide component 50 is secured to beams 12C of the frame 12 that extend between the horizontal beams 12A near the top of the frame 12 to the vertical beams 12B that extend down toward the traction roller shaft 22. Accordingly, the guide component 50 is angled upwardly and rearwardly over the gap 30. When the peel-away support member 110 is forced further upward as the tool 10 rolls forward, the end 110A of the peel-away support member 110 that was initially at the position shown in dashed lines in FIG. 2, will encounter the guide component 50 and be directed up and back to the position shown in solid. The peel-away support member 110 can then eventually be grasped at its location rearward of the guide component 50 and recycled or discarded.

Because the peeling wheel 24 trails behind the traction roller 16 and is driven by contact with the traction rims 16A, 16B, in order to keep it in the lowered position shown in FIGS. 1A and 2, so that the protrusions 32 will contact the peel-away support member 110, the tool 10 includes a peeling wheel stabilizer 54. In the embodiment of FIGS. 1A-3, the peeling wheel stabilizer 54 is a torsion spring 54 centered about a center axis 56 of the traction roller 16, which is also the center axis of the traction roller shaft 22. There are two peeling wheel stabilizers 54, each configured as torsion springs and each adjacent a different one of the two trailer arms 28, as best shown in FIG. 3. The torsion spring 54 has a first leg 54A fixed to the frame 12 at the vertical beam 12B. The first leg 54A may be directly fixed to the frame 12, or indirectly fixed to the frame 12 by being directly fixed to another component, such as the link 20, which is in turn fixed to the frame 12. The torsion spring 54 also has a second leg 54B that extends along the trailer arm 28 and is fixed to the wheel shaft 26. For example, a pin 58 extends from the wheel shaft 26 and captures the second leg 54B. The torsion spring 54 thus biases the peeling wheel 24 to the position shown in FIGS. 1A and 2, counteracting forces of the traction rims 16A, 16B that could otherwise tend to cause the traction hubs 24A, 24B to ride upward on the rotating traction rims 16A, 16B and would lift the peeling wheel 24 away from the body 120 and make it more difficult to pick up the end 110A of the peel-away support member 110. The torsion spring 54 provides some compliance to allow the peeling wheel 24 to ride the potentially uneven elevation of the trim component 100 and the body 120, but biases the peeling wheel 24 against these surfaces for a constant peeling operation.

In addition to the peeling wheel stabilizer 54 that keeps the peeling wheel 24 down, the tool 10 includes a traction adjustment mechanism 60 that adjusts the traction between and keeps the traction rims 16A, 16B and the traction hubs 24A, 24B engaged with one another to enable constant driving of the peeling wheel 24. In the embodiment shown in FIGS. 1A, 2, and 3, a separate traction adjustment mechanism 60 is provided adjacent each trailer arm 28 so that the tool 10 includes two traction adjustment mechanisms 60, as best shown in FIG. 3. The traction adjustment mechanism 60 includes the trailer arm 28 configured as a partially externally-threaded set screw 68 that slidably extends through aligned apertures 70, 72 in each of the wheel shaft 26 (aperture 70) and the traction roller shaft 22 (aperture 72). The apertures 70 and 72 are best indicated in FIGS. 1 and 3. A non-threaded portion of the set screw 68 extends between the apertures 70,72 and serves as the trailer arm 28. A compression spring 62 is disposed along the threaded portion of the set screw 68 and acts against the traction roller shaft 22 via a nut 64 and a washer 66 also on the set screw 68. More specifically, the spring 62 is shown captured between a nut 64 and the washer 66, and the washer 66 acts against the traction roller shaft 22. As the set screw 68 extends through the apertures 70 and 72, turning the nut 64 has a tendency to change the distance 73 (see FIG. 2) between the traction roller shaft 22 and the peeling wheel shaft 26 due to the reaction force of the compression spring 62 and results in the adjustment of contact pressure or traction force between the traction rims 16A, 16B and the traction hubs 24A, 24B, respectively.

Figure 4:
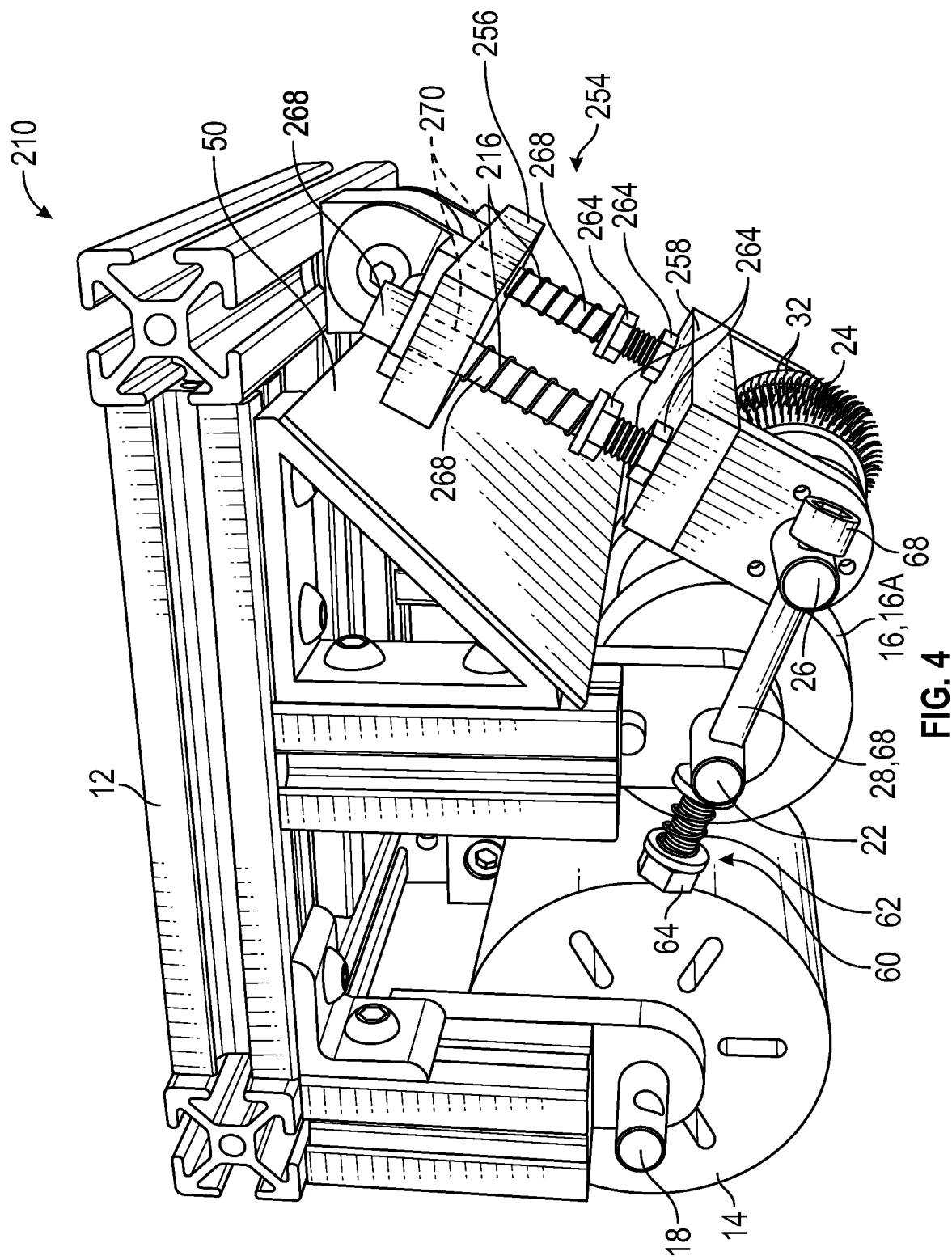
FIG. 4 is a perspective view of a second embodiment of a roll-and-peel tool.
Figure 5:
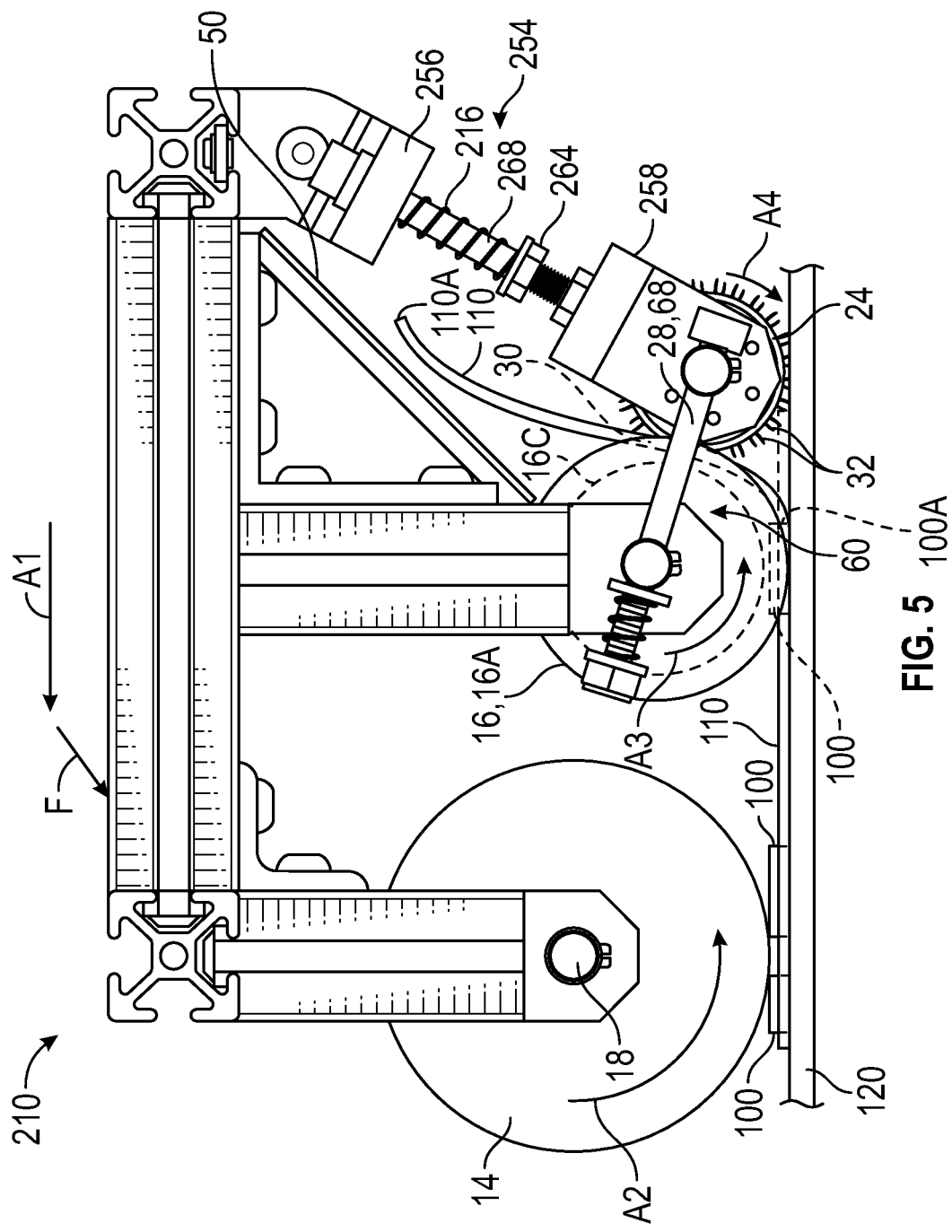
FIG. 5 is a side view of the roll-and-peel tool of FIG. 4 installing a trim component on a body, with the body shown in fragmentary view.

FIG. 4 shows another embodiment of a roll-and-peel tool 210 that is identical to the roll-and-peel tool 10 except that, instead of the two peeling wheel stabilizers 54 configured as torsion springs, the roll-and-peel tool 210 includes a wheel stabilizer 254 that has a first link 256 pivotably connected to the frame 12, a second link 258 pivotably connected to the wheel shaft 26, and a compression spring 216 captured between the first link 256 and the second link 258. A partially threaded set screw 268 slidably extends through an aperture 270 in the first link 256 and is thus adaptable to the varying distance between the first link 256 and the second link 258 due to the position change of the peeling wheel 24 riding on the potentially uneven elevation of the trim component 100 and the body 120. The compression spring 216 is captured between a nut 264 and the underside of the first link 256 along the set screw 268 and biases the second link 258 away from the first link 256 so as to keep the protrusions 32 of the peeling wheel 24 in constant contact with the body 120 or the trim component 100 for peeling the peel-away support member 110. The position of the nut 264 is adjustable on the threaded portion of the set screw 268 for changing the reaction force of the compression spring 216 to an optimal level of compliance which ensures smooth peeling action as well as avoids scuffing the finished surface of the body 120 or the trim component 100. Another nut 264 is disposed against the second link 258 to lock the set screw 268 on the second link 258. In the embodiment shown, the wheel stabilizer 254 includes two set screws 268 extending through two spaced apertures 270 in the first link 256, two compression springs 216, and four nuts 264, two around each set screw 268. Having two such set screws 268 enables greater balance of the stabilizer 254 over the peeling wheel 24 and also leaves an escape window (the space between the two set screws 268) for the peel-away support member 110 to be disposed. FIG. 5 shows the roll-and-peel tool 210 functioning to pressure roll and wet out the trim component 100 against the body 120 and simultaneously peel the peel-away support member 110 from the trim component 100 in the same manner described with respect to the roll-and-peel tool 10.

Figure 6:
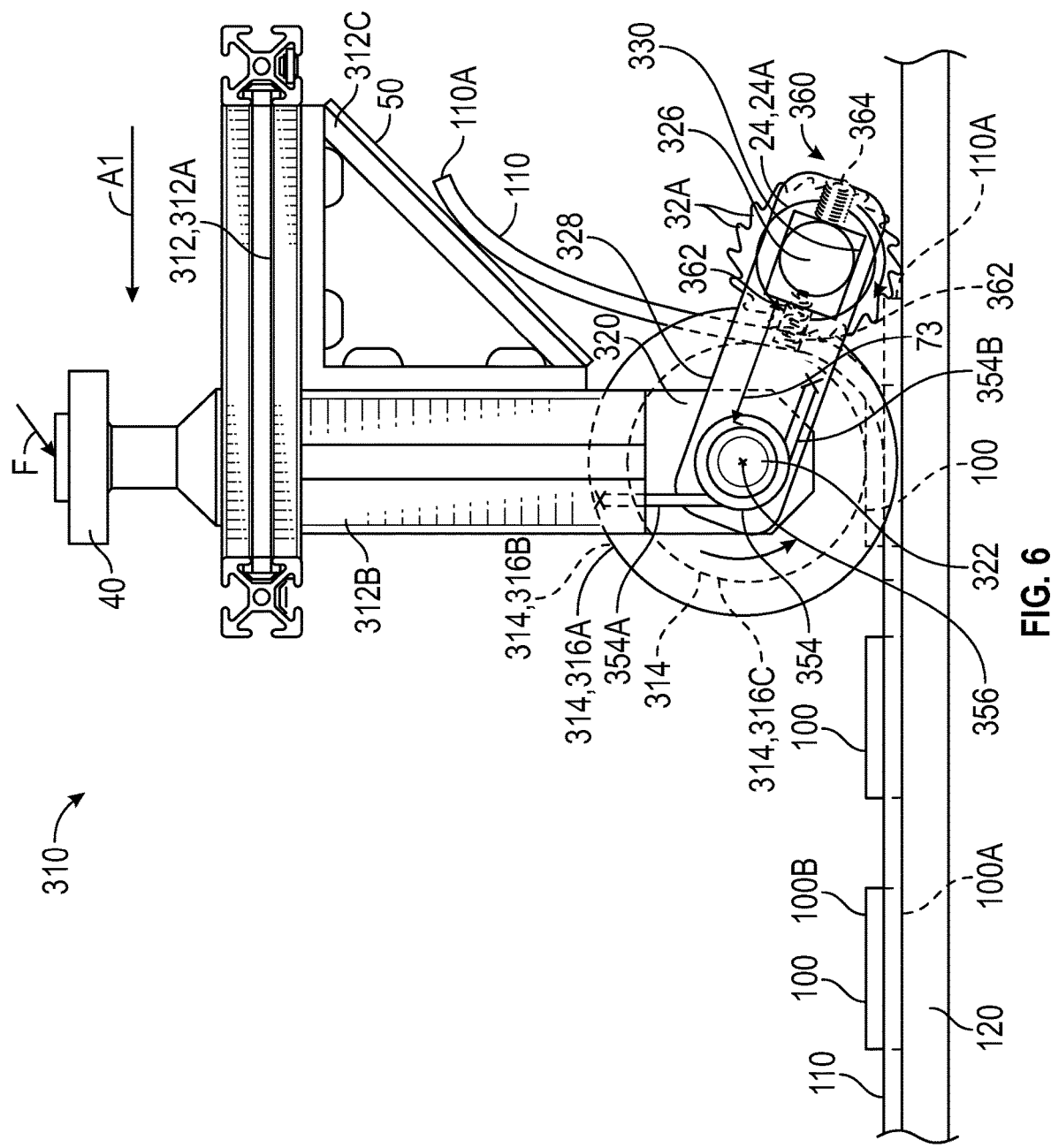
FIG. 6 is a side view of a third embodiment of a roll-and-peel tool installing a trim component on a body, with the body shown in fragmentary view.

FIG. 6 is a side view of a third embodiment of a roll-and-peel tool 310 in the process of installing a trim component 100 on a body 120, with the body 120 shown in fragmentary view. The roll-and-peel tool 310 functions to pressure roll and wet out the trim component 100 against the body 120 and simultaneously peel the peel-away support member 110 from the trim component 100 but does so with a single roller 314 that functions as both a pressure roller and a traction roller. The single roller 314 rotates about a roller shaft 322 that is supported by a frame 312. The frame 312 is similar to frame 12 in that it has horizontal beams 312A and vertical beams 312B. The roller shaft 322 is supported on two spaced vertical beams 312B (one visible in the side view) so that both ends of the shaft 322 are supported by a separate vertical beam 312B. The guide component 50 is secured to one or more beams 312C of the frame 312 that extend between the horizontal beams 312A near the top of the frame 312 to the vertical beams 312B that extend down over and to support the roller shaft 322.

The single roller 314 includes axially-spaced traction rims 316A, 316B similar to traction rims 16A, 16B as described with respect to FIG. 1, and a roller midportion 316C extending between the traction rims 316A, 316B but sized larger than the traction roller midportion 16C of the tool 10 such that the roller midportion 316C is always in rolling contact with the trim component 100 and serves to wet-out the adhesive on the adhesive side 100A of the trim component 100, similar in function to the pressure roller 14. The roller midportion 316C also drives the traction rims 316A, 316B to roll in the same direction, which in turn drives the peeling wheel to rotate in the opposite direction via the traction engagement between the traction rims 316A, 316B and the traction hubs 24A, 24B, respectively.

Figure 1C:
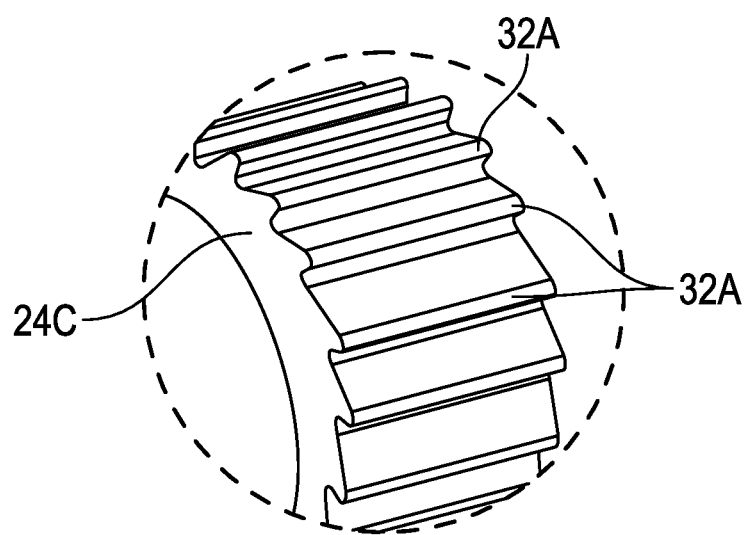
FIG. 1C is a close-up fragmentary view of alternate protrusions on the peeling wheel of FIG. 1A.

The peeling wheel 24 is configured as described with respect to FIG. 1, and includes protrusions 32A as described with respect to FIG. 1C. The peeling wheel 24 is supported to rotate on a peeling wheel shaft 326 that is similar to the wheel shaft 26 except that, instead of having an aperture for a trailer arm to pass through, the wheel shaft 326 passes through an aperture 330 in a trailer arm 328. The trailer arm 328 has another opening through which the roller shaft 322 extends. The wheel shaft 326 can be adjusted in position along the trailer arm 328 by moving within the aperture 330 further from or closer to the roller shaft 322. The roller shaft 322 is fixed in position on the trailer arm 328. The trailer arm 328 supports a set screw 364 that is adjustable to move against the wheel shaft 326, adjusting the position of the wheel shaft 326 within the aperture 330 (and thereby changing the distance 73 between the roller shaft 322 and the wheel shaft 326). A compression spring 362 is supported in the trailer arm 328 and has an end that acts against the wheel shaft 326. Accordingly, the set screw 364 and compression spring 362 function as a traction adjustment mechanism 360 to adjust the traction between the traction rims 316A, 316B and the traction hubs 24A, 24B, respectively.

Additionally, the tool 310 includes a peeling wheel stabilizer 354 that is a torsion spring similar to torsion spring 54. The torsion spring 354 is centered about a longitudinal axis 356 of the single roller 314, which is also the axis 356 of the roller shaft 322. There are two peeling wheel stabilizers 354, each configured as torsion springs and each adjacent a different one of the two trailer arms 328 (one visible in the side view of FIG. 6). The torsion spring 354 has a first leg 354A fixed to the frame 312 at the vertical beam 312B. The first leg 354A may be directly fixed to the frame 312, or indirectly fixed to the frame 312 by being directly fixed to another component, such as a link 320, which is in turn fixed to the frame 312. The torsion spring 354 also has a second leg 354B that extends along and is fixed to the trailer arm 328. The torsion spring 354 thus biases the peeling wheel 24 to the position shown in FIG. 6, counteracting forces of the traction rims 316A, 316B that could otherwise tend to cause the traction hubs 24A, 24B to ride upward on the rotating traction rims 316A, 316B and would lift the peeling wheel 24 away from the body 120 and make it difficult for the protrusions 32A to pick up the end 110A of the peel-away support member 110.

Accordingly, various embodiments of roll-and-peel tools 10, 210, 310 disclosed herein increase the efficiency and accuracy of trim component installation by accomplishing wet-out and peeling functions with one motion of a single tool, operated either manually or robotically. The installation of trim components that adhere to a body, such as emblems that adhere to a vehicle body panel, may be simplified and made more efficient with the use of these tools 10, 210, or 310.

While the best modes for carrying out the disclosure have been described in detail, those familiar with the art to which this disclosure relates will recognize various alternative designs and embodiments for practicing the disclosure within the scope of the appended claims.

What is claimed is:

1. A roll-and-peel tool for installing a trim component on a body, the roll-and-peel tool comprising:
   a frame;
   a roller shaft supported by the frame;
   a roller rotatable relative to the frame on the roller shaft, the roller including two traction rims axially-spaced from one another along the roller and a roller midportion between the traction rims, the traction rims extending outward of the roller midportion;
   a peeling wheel having two traction hubs axially-spaced from one another and a plurality of protrusions extending proud at an exterior surface of the peeling wheel between the traction hubs;
   a wheel shaft about which the peeling wheel is rotatable; and
   a trailer arm connecting the wheel shaft and the roller shaft so that the traction hubs interface with the traction rims and a gap is defined between the roller midportion and the peeling wheel with the protrusions extending into the gap;
   wherein the roller rolls in a direction of movement of the frame with the peeling wheel trailing the roller and the peeling wheel driven to rotate in a direction opposite to a direction of rotation of the roller by the traction rims interfacing with the traction hubs.

2. The roll-and-peel tool of claim 1, wherein the roller is a traction roller and the roller shaft is a traction roller shaft, and the roll-and-peel tool further comprising:
   a pressure roller and a pressure roller shaft, the pressure roller shaft supported by the frame forward of the traction roller, and the pressure roller rotatable relative to the frame on the pressure roller shaft in the direction of rotation of the traction roller shaft, the pressure roller and the traction hubs defining a three-point contact of the roll-and-peel tool.

3. The roll-and-peel tool of claim 1, further comprising:
   a peeling wheel stabilizer including a torsion spring centered about an axis of the roller, the torsion spring having a first leg fixed to the frame and a second leg extending along the trailer arm and fixed to the wheel shaft.

4. The roll-and-peel tool of claim 1, further comprising:
   a peeling wheel stabilizer including:
      a first link pivotably connected to the frame;
      a second link pivotably connected to the wheel shaft or to the trailer arm;
      a set screw slidably connecting the first link and the second link; and
      a compression spring surrounding the set screw.

5. The roll-and-peel tool of claim 1, further comprising:
   a traction adjustment mechanism including:
      either a threaded portion of the trailer arm configured as a set screw or a set screw supported by the trailer arm; and
      a compression spring acting against the wheel shaft;
      wherein the set screw is adjustable to change a contact pressure between the traction rims and the traction hubs.

6. The roll-and-peel tool of claim 1, wherein the plurality of protrusions are a plurality of hooks of a hook-and-loop material.

7. The roll-and-peel tool of claim 1, further comprising:
   a guide component fixed to the frame over the gap and extending rearward over the peeling wheel.

8. The roll-and-peel tool of claim 7, wherein the guide component is a plate extending upwardly and rearwardly over the gap.

9. The roll-and-peel tool of claim 1, further comprising:
   a grip extending from the frame and configured to receive a force for moving the roll-and-peel tool.

10. The roll-and-peel tool of claim 1, wherein the trim component has an adhesive side and an exterior side, and the roller is configured to apply pressure to the exterior side of the trim component to wet out the adhesive side against the body, and the traction rims are configured to roll on the body, straddling over the trim component.

11. A roll-and-peel tool for installing a trim component on a body, the roll-and-peel tool comprising:
    a frame;
    a pressure roller shaft supported by the frame;
    a pressure roller rotatable relative to the frame on the pressure roller shaft;
    a traction roller shaft supported by the frame and disposed rearward of the pressure roller;
    a traction roller rotatable relative to the frame on the traction roller shaft, the traction roller including two traction rims axially-spaced from one another along the traction roller and a traction roller midportion between the traction rims;
    a peeling wheel having two traction hubs axially-spaced from one another and a plurality of protrusions extending proud at an exterior surface of the peeling wheel between the traction hubs;
    a wheel shaft about which the peeling wheel is rotatable;
    a trailer arm extending from the wheel shaft to the traction roller shaft and connecting the wheel shaft and the traction roller shaft so that the traction hubs interface with the traction rims and a gap is defined between the traction roller midportion and the peeling wheel with the protrusions extending into the gap;
    wherein the peeling wheel trails the traction roller and is driven to rotate in a direction opposite to a direction of rotation of the traction roller by the traction rims interfacing with the traction hubs, the protrusions configured to extend into the gap.

12. The roll-and-peel tool of claim 11, wherein a diameter of the pressure roller is greater than a diameter of the traction rims, and the diameter of the traction rims is greater than a diameter of the traction hubs.

13. The roll-and-peel tool of claim 11, further comprising:
a peeling wheel stabilizer including a torsion spring centered about an axis of the traction roller, the torsion spring having a first leg fixed to the frame and a second leg extending along the trailer arm and fixed to the wheel shaft.

14. The roll-and-peel tool of claim 11, further comprising:
a peeling wheel stabilizer including:
- a first link pivotably connected to the frame;
- a second link pivotably connected to the wheel shaft or to the trailer arm;
- a set screw slidably connecting the first link and the second link; and
- a compression spring surrounding the set screw.

15. The roll-and-peel tool of claim 11, further comprising:
a traction adjustment mechanism including:
- either a threaded portion of the trailer arm configured as a set screw or a set screw supported by the trailer arm; and
- a compression spring acting against the wheel shaft;
- wherein the set screw is adjustable to change a contact pressure between the traction rims and the traction hubs.

16. The roll-and-peel tool of claim 11, wherein the plurality of protrusions are a plurality of hooks of a hook-and-loop material.

17. The roll-and-peel tool of claim 11, further comprising:
a guide component fixed to the frame over the gap and extending rearward over the peeling wheel.

18. A method of installing a trim component on a body, the trim component having an adhesive side, an exterior side, and the trim component assembled with a peel-away support member in a preinstalled state, the method comprising:
- placing the adhesive side of the trim component against the body;
- positioning a roll-and-peel tool over the trim component; and
- rolling the roll-and-peel tool along the body, the roll-and-peel tool simultaneously wetting out the adhesive side against the body and peeling the peel-away support member away from the trim component.

19. The method of claim 18, wherein rolling the roll-and-peel tool includes applying a downward and forward pressure on the roll-and-peel tool.

20. The method of claim 18, wherein the roll-and-peel tool includes:
- a frame;
- a roller and a roller shaft, the roller shaft supported by the frame, and the roller rotatable relative to the frame on the roller shaft;
- two traction rims extending outward from the roller and axially-spaced from one another along the roller with a roller midportion between the two traction rims;
- a peeling wheel, a wheel shaft about which the peeling wheel is rotatable, the peeling wheel having two traction hubs axially-spaced from one another and a plurality of protrusions extending proud from the peeling wheel between the traction hubs;
- a trailer arm connecting the wheel shaft and the roller shaft so that the traction hubs interface with the traction rims and a gap is defined between the roller midportion and the peeling wheel with the protrusions extending into the gap; and
- wherein the roller rolls over the exterior side of the trim component in a direction of movement of the frame with the peeling wheel trailing the roller and the peeling wheel driven to rotate in a direction opposite to a direction of rotation of the roller by the traction rims interfacing with the traction hubs, the protrusions configured to engage the peel-away support member and peel it away from the trim component in the gap.

* * * * *